United States Patent [19]
Chen et al.

[11] Patent Number: 5,888,026
[45] Date of Patent: Mar. 30, 1999

[54] BACKFILL PASTE PRODUCTION FACILITY AND METHOD AND APPARATUS FOR PRODUCING HIGH DENSITY SLURRY AND PASTE BACKFILLS

[75] Inventors: Long Jin Chen; Daniel G. Millette; Alfred Annor, all of Sudbury, Canada

[73] Assignee: Her Majesty The Queen in Right of Canada, as represented by the Minister of Natural Resources, Ottawa, Canada

[21] Appl. No.: 786,965

[22] Filed: Jan. 24, 1997

[51] Int. Cl.⁶ .......................... B01D 21/02; B01D 21/32; C09K 17/00
[52] U.S. Cl. .......................... 405/266; 210/205; 210/803
[58] Field of Search .................. 405/263–268; 210/198.1, 205, 220, 738, 803, 410, 411, 532.1, 534

[56] References Cited

U.S. PATENT DOCUMENTS

| | | | |
|---|---|---|---|
| 2,283,365 | 5/1942 | Heinkel | 137/328 |
| 2,861,694 | 11/1958 | Katow et al. | 210/534 |
| 3,168,470 | 2/1965 | Rhoda | 210/239 |
| 3,306,446 | 2/1967 | Lewis | 210/114 |
| 3,406,830 | 10/1968 | Greensmith | 210/241 |
| 3,693,795 | 9/1972 | Robinson et al. | 210/804 |
| 3,718,003 | 2/1973 | Cook et al. | 405/129 |
| 3,852,967 | 12/1974 | Stewart et al. | 405/128 |
| 3,869,384 | 3/1975 | Schutte | 210/703 |
| 3,901,811 | 8/1975 | Finch | 210/538 |
| 3,979,290 | 9/1976 | Löffler | 210/745 |
| 4,019,327 | 4/1977 | Kempster | 405/264 |
| 4,059,963 | 11/1977 | Wayment | 405/267 |
| 4,101,333 | 7/1978 | Wayment | 106/811 |
| 4,273,650 | 6/1981 | Solomon | 210/104 |
| 4,504,397 | 3/1985 | Matthews | 210/804 |
| 4,579,659 | 4/1986 | Eades et al. | 210/541 |
| 4,867,872 | 9/1989 | Russell et al. | 210/104 |
| 5,405,063 | 4/1995 | Chen | 222/494 |

FOREIGN PATENT DOCUMENTS

| | | |
|---|---|---|
| 1122537 | 4/1982 | Canada . |
| 2006928 | 12/1989 | Canada . |
| 2129048 | 2/1993 | Canada . |
| 2118847 | 3/1994 | Canada . |
| 2009905 | 8/1994 | Canada . |
| 0403784A | 12/1990 | European Pat. Off. . |
| 3529682A | 3/1987 | Germany . |
| 4104282A | 8/1991 | Germany . |
| 19539684A | 4/1997 | Germany . |

*Primary Examiner*—Tamara L. Graysay
*Assistant Examiner*—Tara L. Mayo

[57] ABSTRACT

The invention relates to a method and apparatus for producing high density slurry and paste backfills for use in mining operations and to associated backfill paste production facilities which incorporate the aforesaid method and apparatus. The high density slurry or paste is produced from a mill tailings mixture in a silo which includes a percolation/decant device for pecolating water out of the mill tailings mixture and for decanting clarified water from atop the settled tailings. While settling occurs, air is introduced from the bottom of the silo to agitate the mixture to ensure substantially homogeneous settlement of the solids. Once settled, the resultant high density slurry or paste is fluidized by air in order to give the paste more readily flowable characteristics. The flowable paste can then be mixed with a setting agent and pumped or transported to the mine site to be used as a settable backfill.

37 Claims, 4 Drawing Sheets

BACKFILL PASTE PRODUCTION FACILITY AND METHOD AND APPARATUS FOR PRODUCING HIGH DENSITY SLURRY AND PASTE BACKFILLS

FIELD OF THE INVENTION

The invention relates to a method and apparatus for producing high density slurry and paste backfills for use in mining operations and to backfill paste production facilities which incorporate the aforesaid method and apparatus.

BACKGROUND OF THE INVENTION

There are many different reasons for using backfilling in mines and not only to the benefit of the environment. In some cases, creating an opening underground poses no problem other than with the disposal of waste materials. However, in most types of rock, when an opening is created, it causes stress realignment around the opening. This not only creates problems with spalling and rock falls during rockbursts but also limits the size of the opening that can be made.

Some of the reasons backfill is used in mines (not in any specific order):

(a) to keep highly stressed rock around an opening from spalling. Spalling not only dilutes the ore but it can cause hazards in stopes where people are working;

(b) to keep negatively stressed rock (in tension) around an opening from coming loose for the same reasons in (a) above;

(c) to absorb some of the excess stresses in order to minimize damage from rockbursting;

(d) to act as pillars in some types of mining to permit removal of more ore;

(e) as a working platform for personnel and equipment in undercut and fill operations;

(f) to prevent surface subsidence in shallow mines or soft rock mines;

(g) to alleviate environmental hazards associated with surface disposal of waste materials; and (h) to dispose of large quantities of mining wastes underground.

Various traditional materials have been used for backfill, the choice of which is usually dependent upon the reason for backfilling and on cost. Some of the materials include but are not limited to:

(a) cemented rockfill (stiff fill);

(b) uncemented esker sand;

(c) gravel;

(d) uncemented classified mill tailings (cycloned to separate the very fine particles or slimes) and unclassified (total tailings) in hydraulic form (40% to 55% solids content);

(e) cemented classified and unclassified mill tailings in hydraulic form; and (f) a combination of esker sands and classified and unclassified tailings. With the growing environmental concern for tailings disposal on surface, there has been a growing interest in using the tailings for mine backfill whether or not backfill is necessary for ground control purposes. Mill tailings have traditionally been used for backfilling of mines but usually in a classified form. Once classified, the finer portion of the material (slimes) was then sent to the surface disposal site or tailings pond. However, in recent years, mine operators have seen the need to dispose of their total tailings in the form of backfill.

The use of hydraulic tailings fill entails considerable preparation before the filling of the opening can commence. First a bulkhead must be constructed which will hold back the hydraulic mass while allowing water to percolate out of the fill. In some larger mines, drainage pipes such as extruded plastic weeping tile are hung from the top of the stope and brought together under the bulkhead. If a large stope is being filled, a plug is often poured first with a higher cement content (up to 30%) to just above the bulkhead. When the plug is set, the remainder of the stope is filled with the weaker cemented fill (normally around 10% cement). Such extensive preparation is costly in terms of both time and capital.

Another major cost associated with the use of hydraulic backfill is the water that leaches out of the fill mass must be pumped back up to surface. If the mining method used calls for mining to progress against the backfill, sufficient time must be allowed for the fill to drain and cure which can typically be on the order of from 28 to 56 days.

As alternatives to hydraulic fill, high density slurry or paste backfills may be used. High density slurry is simply a thicker hydraulic fill. It has a solids content in the range of 60% to 70% rather than the 40% to 55% range of hydraulic fills. The lower water content requires less extensive bulkhead construction, exhibits faster percolation times, requires less water to be pumped back up to the surface, and requires less cement to achieve the same strength as hydraulic fill.

Paste backfill is an even higher density tailings material in the range of 76% to 84% solids content, depending on the size gradation of the material. By definition, a paste is a material that does not exude water after it has been placed. Such a material has many benefits when used as a backfill in that it does not require water to pumped back up to the surface, lighter or even no bulkhead construction, much less time to resume mining, and it only uses 1.5% to 3% cement. The main drawback in the use of pastefill is that due to its consistency, it is difficult to transport.

Prior Art High Density Slurry / Paste Fill Systems

Currently known systems used to thicken hydraulic tailings slurry to a higher density or paste employ commercially available drum filters, thickeners and/or blend the slurry with alluvial sand to produce paste. While the sand is used in the process to try to achieve a higher strength due to the particle size of the sand, excavation of alluvial sand raises environmental issues.

The thickener system starts out with the tailings in a storage silo. From the storage silo, the tailings are dumped into the thickener. Once the mixture has thickened sufficiently, it is dumped to a mixer where cement is added. After mixing, the resultant backfill material is either pumped or gravity fed to the underground stopes. This thickener system prepares paste in batches as it takes time to remove the water in the thickener. Therefore, if a continuous backfilling system is required, two tailings storage silos and two thickeners are required. The main drawbacks associated with this system are that the thickeners are very costly, i.e. up to $1,000,000 each; being mechanical devices, they require a high level of maintenance; due to the various factors which can affect the thickening process, the fill plant operator must be consistent in judging the release time of the fill from the thickener; thickeners are large and require considerable floor space; and the energy costs to operate such thickeners are relatively high.

The drum filter system begins thickening in the same way, with hydraulic tailings coming from a storage silo. The slurry is fed from the silo to one or more drum filters. These filters use a permeable membrane and air to remove most of the water from the slurry, leaving a cake of tailings (filter cake) on the drums. The actual paste production involves re-pulping the filter cake by adding a controlled amount of water and cement and mixing to obtain the proper consistency. The material is then poured or pumped from the mixer to the stopes.

While the initial cost of a drum filter system is much lower than that of a thickener, the drum filter system still suffers from some major disadvantages which include the large floor space required for the storage of the filter cakes; personnel required to handle the cake between filter, storage and the re-pulping process; the maintenance costs of the filters; and the fact that the operator has less control due to the handling required and the resulting extra personnel involved.

SUMMARY OF THE INVENTION

The present invention overcomes the aforementioned drawbacks and disadvantages by providing an integral containment vessel and high density slurry or paste producing unit which accepts the mill tailings and processes them into a backfill paste ready to be mixed if desired with a setting agent for use as a backfill in mining operations.

As the mine tailings slurry enters the vessel, it immediately begins a settling process. This process by gravity settling alone, normally requires 24 to 48 hours. Due to the fine nature of the material, it is very slow to settle and must be agitated to avoid uneven settling of particles and to produce a homogeneous end product. While it is known to use water jets to agitate slurries, with water jets, the settled tailings are fluidized in the bottom of the vessel, rat-holing frequently occurs due to plugging nozzles and insufficient local fluidization, and the addition of water is counter-productive and limits the maximum pulp density (solids content) of the end product.

In the present invention, while the slurry is being dewatered, air is injected into the slurry to fluidize the settled tailings. Solid particles are fully fluidized by the air from the bottom to the top of the vessel, resulting in a paste with uniform particle size distribution and viscosity. The fluidized paste is pumpable and the paste in the vessel can be made to flow under the influence of gravity in a smooth and stable manner. Furthermore, it has been found that it is possible to obtain even higher pulp densities by fluidizing tailings settled in the silo as compared with gravitational settling methods.

In normal operations, the output of tailings from the mill is approximately 30% solids, the remainder is water. To achieve a paste backfill, the slurry must be thickened to between 67% and 87% solids, depending on the particle size distribution and the specific gravity of the incoming material, thus requiring a substantial amount of the water to be removed. By speeding up the removal of water, the length of time for the overall process can be reduced substantially.

In order to increase the rate at which water is removed from the mill tailings, there is provided in the present invention a novel device which will be referred to herein as a percolation/decant insert. The percolation/decant insert, as the name implies, is a dual purpose unit which allows the water in the slurry to percolate into the device during settling and also decants the water left on top of the solids as a result of the settling. As the solids settle in the silo, clear water is left on the surface. Rather than manually inserting a suction hose to pump this water or waiting for the solids to discharge and pouring the water out later, it can be removed, i.e. decanted, during the process. In general, the percolation/decant insert comprises a screen portion through which water in the slurry can percolate, a variable height decant portion atop the screen portion through which the clearer water at the surface of the slurry can be decanted, and means for removal of the decanted and/or percolated water.

The use of the percolation/decant insert increases the dewatering rate significantly as compared with a similar vessel utilizing a combination of gravity settling and drawing off of clarified liquid. Not only is the thickening time considerably reduced, since the throughput of the vessel can thereby be significantly increased, vessel sizes can be comparatively smaller and still out-produce conventional gravity settling vessels in paste production. It has also been found that the final product can be made up to 5% more dense than with conventional methods.

While the operating containment vessels may be newly constructed, since most mining operations already have in place existing storage silos for receiving and dispensing the hydraulic tailings material, the elements of the present invention may be readily adapted for implementation therein.

The primary advantages in using such a system is that the process can take less than 25% of the normal time required to densify tailings; no additional buildings or other such structures are required for the plant if holding silos already exist; due to the very few mechanical components, less maintenance is required; the system is compact and uses only slightly more floor space than required for the silo(s); the system is easily expandable, because of its modular nature. e.g., a 2 silo continuous system can have its capacity increased 50% by the addition of one more silo; the system is readily completely automated; there are comparatively very low manufacturing and installation costs as compared with present options; and the system requires very little energy to operate.

The present invention also relates to a method for producing high density slurry or paste backfill which method is embodied to a certain extent in the manner in which the aforementioned apparatus functions. The invention further includes a high density slurry or paste backfill production facility which incorporates the novel integral containment vessel and high density slurry or paste producing unit.

These and other features of the invention will become apparent from the detailed description set out hereinbelow and the accompanying drawings in which:

DESCRIPTION OF THE PREFERRED EMBODIMENT

Figure 1:
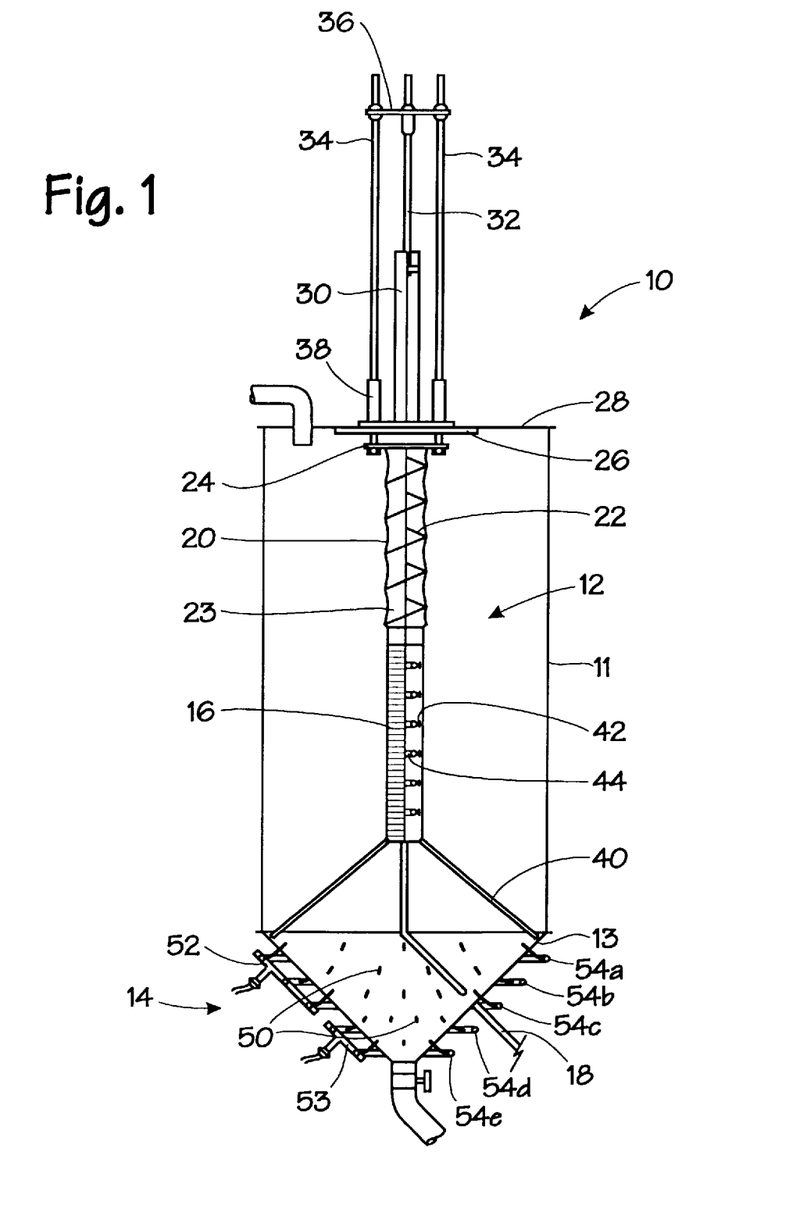
FIG. 1 is a side elevation of the integral containment vessel and high density slurry or paste producing unit according to the invention, partially broken away to reveal the percolation/decant insert and the interior and exterior features.

Referring now to FIG. 1, there is shown an integral containment vessel and high density slurry or paste producing unit 10, comprising in this case a silo 11 fitted with a percolation/decant insert 12 and an air fluidization/agitation system 14. The silo 11 shown includes a conical bottom 13, but may have a hemispherical or other shaped bottom.

The percolation portion of the device is a custom built water-well screen 16. These screens preferably consist of a cylindrical, vertical, stainless steel framework with bands of stainless steel wrapped around the framework and machine welded. A specified gap is left between the bands (for example, a #8 screen has a 0.008" gap). The porosity of the screen or screen number used depends on the size of the material being settled.

A conduit 18 at the bottom of the percolation screen 16 allows water which percolates through the screen to be removed from the vessel by means of gravity. Alternately, a stainless steel submersible pump could be placed in the bottom of the percolation screen 16 and connected to a current sensing switch. When there is sufficient water in the screen 16, the pump will activate and pump the water out of the silo and back to the original process for reuse.

Above the screen 16 is the decant portion 20 of the device. In general, the decanter 20 is an adjustable length conduit which extends above the screen 16. In the preferred embodiment, a light coil spring 22 is attached at one end to the top of the percolation screen 16 and the other end to an annular plate 24. The plate 24 has an aperture through which the surface water may be decanted. The spring 22 is covered preferably with a ½" thick, rubber-like material 23, such as LINATEX™.

The annular plate 24 may be raised and lowered by any form of suitable activation means. As shown in FIG. 1, a pneumatic or hydraulic cylinder 30 is used as the activation means for the decanter 20. A pneumatically operated system is actually preferred since a source of compressed air is needed for use with the agitation/fluidization system 14. The pneumatic cylinder 30 is mounted by way of a mounting plate 26 to the upper closure 28 of the silo 11. The cylinder piston 32 is attached to a series of connecting rods 34 through upper frame 36. The connecting rods 32 extend through bushings 38 and through the upper closure 28 and mounting plate 26 to connect with the annular plate 24. Thereby, activation of the cylinder 30 causes piston 32 to move and, hence, causes the annular plate 24 to be raised or lowered accordingly via the connecting rods 34. Lowering of the height of the annular plate 24 will allow the clear water on top of the solids to decant into the percolation screen. This water is removed from the bottom of the percolation screen in the same manner as the percolation water.

To provide additional support and stability to the percolation/decant insert, support members 40 may be provided between the percolation screen 16 and the sides or bottom of the silo 11.

Depending on the nature of the tailings being thickened, it may be necessary to periodically remove debris and other fine particles which accumulate on the screen 16. To this end, there may be provided within the screen a plurality of air nozzles 42 which can blow air through the screen to dislodge any accumulation and to prevent the screen 16 from plugging with fine particles. Advantageously, the air for these air nozzles 42 can be provided from the same source that is used to drive the pneumatic cylinder 30. The air is supplied to the air nozzles 42 through a plurality of air manifolds 44 that encircle the interior of the screen 16. The air is alternately supplied to these manifolds through a rotating air valve (not shown).

At the bottom 13 of the silo 11, there is located the agitation/fluidization system 14. This system 14 includes a plurality of nozzles 50 disposed in the lower end of the silo 11 to provide air injection for both agitation of the settling tailings and fluidization of the thickened product to assist with its removal from the vessel. In the arrangement shown in FIG. 1, the nozzles 50 extend into the silo 11 and are supplied air by exterior manifolds 52, 53. An exterior arrangement of the agitation/fluidization system 14 facilitates maintenance and repair thereof without necessarily having to remove the contents of the silo. As shown in FIG. 1, the nozzles 50 are arranged in a series of concentric rings 54a, 54b, 54c, 54d and 54e to ensure complete agitation and fluidization of the contents of the silo.

Figure 2A:
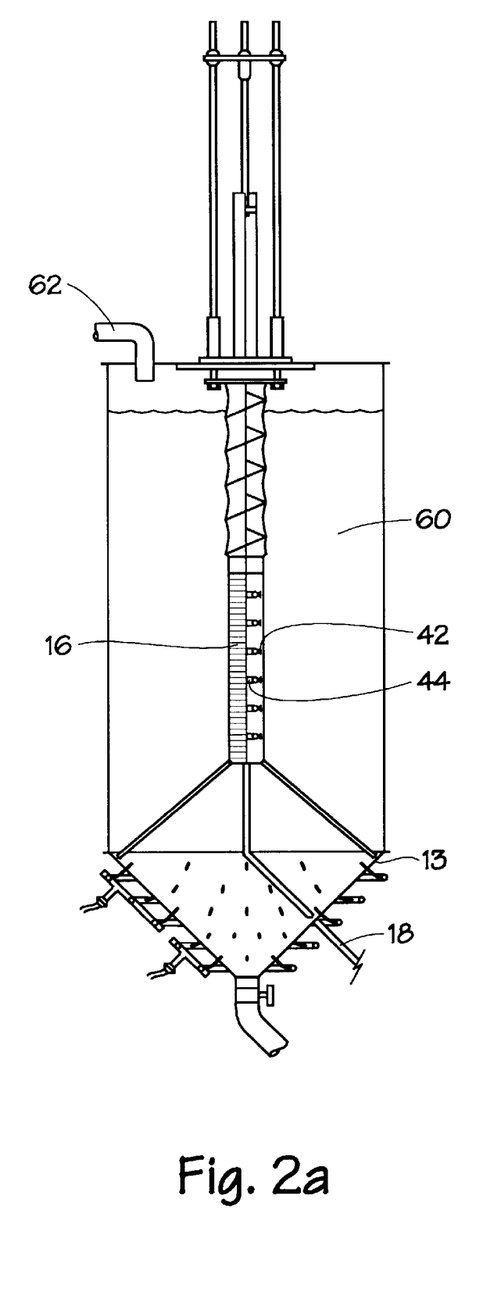
FIGS. 2a and 2b are side elevations of the integral containment vessel and high density slurry or paste producing unit as shown in FIG. 1 and illustrating the operation of the percolation/decant insert.
Figure 2B:
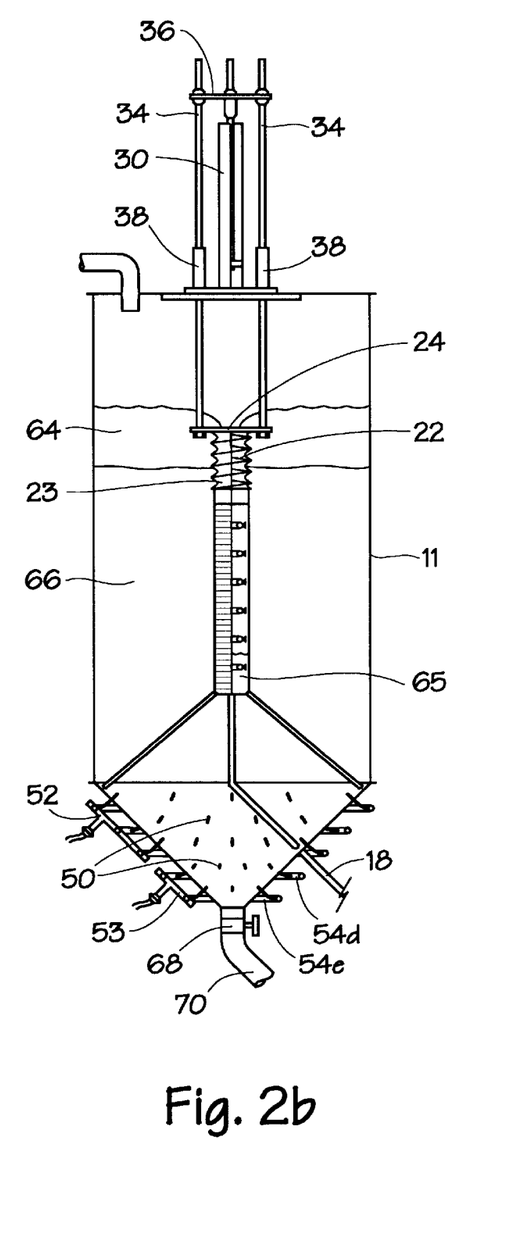

FIGS. 2a and 2b illustrate the operation of the percolation/decant insert. The mill tailings slurry 60 (usually between 20–30% pulp density) enters the top of the silo 11 through inlet conduit 62 and begins to settle toward the bottom 13. The stainless steel screen 16 allows water in the material 60 to percolate through the screen slots while holding back the fine particles. The water then exits by means of gravity through conduit means 18 or via the pump, if provided. The consistency of the mill tailings 60 is similar to silt, therefore they tend to quickly plug the slots in the screen. The screen 16 is cleaned periodically by means of the plurality of air nozzles 42 attached to the plurality of air manifolds 44 that encircle the interior of the screen 16.

When sufficient settling has taken place and there remains a layer of clear water 64 on top of the densified tailings 66 (see FIG. 2b), the pneumatic actuator 30 is retracted. This pulls down on upper frame 36, which in turn exerts a downward pressure on connecting rods 34, pushing them through bushings 38. This results in the annular plate 24 being translated in a downward direction. With its downward travel, spring 22 is compressed, folding the rubber-like covering 23, and allowing the clarified water 64 to decant through the aperture in the annular plate 24, when the height of the plate 24 is below the surface level of the water 64 in the silo 11. The water 65 which is decanted falls under influence of gravity to the bottom of the percolation screen 16 where it exits through the conduit means 18 or by way of the pump, if provided.

By simply letting a tailings material settle in a silo, the larger, heavier particles will settle first and the result is layers of progressively denser material. To ensure a homogenous mix, the tailings should be agitated until settling is completed. Agitation air is injected into the settling contents by means of the air nozzles 50 provided at the lower end of the silo 11.

Once the mine tailings have been densified and dewatered in the silo to anywhere from 76% to 84% solids, it is very difficult to remove from the silo. However, it has been found that the continued agitation of the slurry at higher densities causes a fluidization of the slurry/paste to occur. The result is a homogeneous, dense slurry being produced which behaves as a time-dependent non-Newtonian fluid and possesses good flow characteristics. In most cases, the thus fluidized densified slurry/paste will flow out of the vessel under the influence of gravity when the valve 68 on the outflow conduit 70 is opened (see FIG. 1).

It has also been found that by adding a small quantity of water to the fluidized tailings upon exit, the ability of the high density slurry/paste to flow is enhanced without overdilution. The water acts as a lubricant between the silo-bottom wall and the material inside. The water may be introduced via the nozzles on rings 54*d*, 54*e* through manifold 53 by simply switching the fluid source through valving (shown in FIG. 3). If required, both manifolds 52, 53 can be used to introduce the necessary minimum amount of water to induce the flow of the fluidized slurry/paste.

Preferably, nozzles 50 are of a non-plugging type. In the subject environment, most commercially available nozzles tend to plug when the fluid is switched off. The extremely fine particles present in mine tailings enter the nozzle orifice and harden. Quite often, when the fluid is switched back on, even at higher pressures, the particles do not dislodge. In this regard, the type of non-plugging nozzle disclosed in U.S. Pat. No. 5,405,063, issued Apr. 11, 1995 and assigned to the same Applicant as the subject invention, incorporated herein by reference, has been found to be particularly useful. The nozzles that are used for agitation can be exactly the same nozzles as the fluidization nozzles.

The percolation/decant insert is designed to considerably reduce the thickening or dewatering time, thereby reducing the size requirement of the silos. As an example, a 3,000 ton silo of nickel tailings will take approximately 24 hours to gravity settle from a density of 35% solids to a density of 75% solids. Once settled, the silo contains approximately 2,000 tons of densified material while the remainder is water, thus allowing about 85 tons/hr of material until the next silo is sufficiently settled.

Designing a plant using the percolation/decant insert to obtain 85 tons/hr would only require a 500 ton silo as compared to the 3,000 ton unit in the example above, as the densification time is reduced as well as the usable capacity of the silo.

Figure 3:
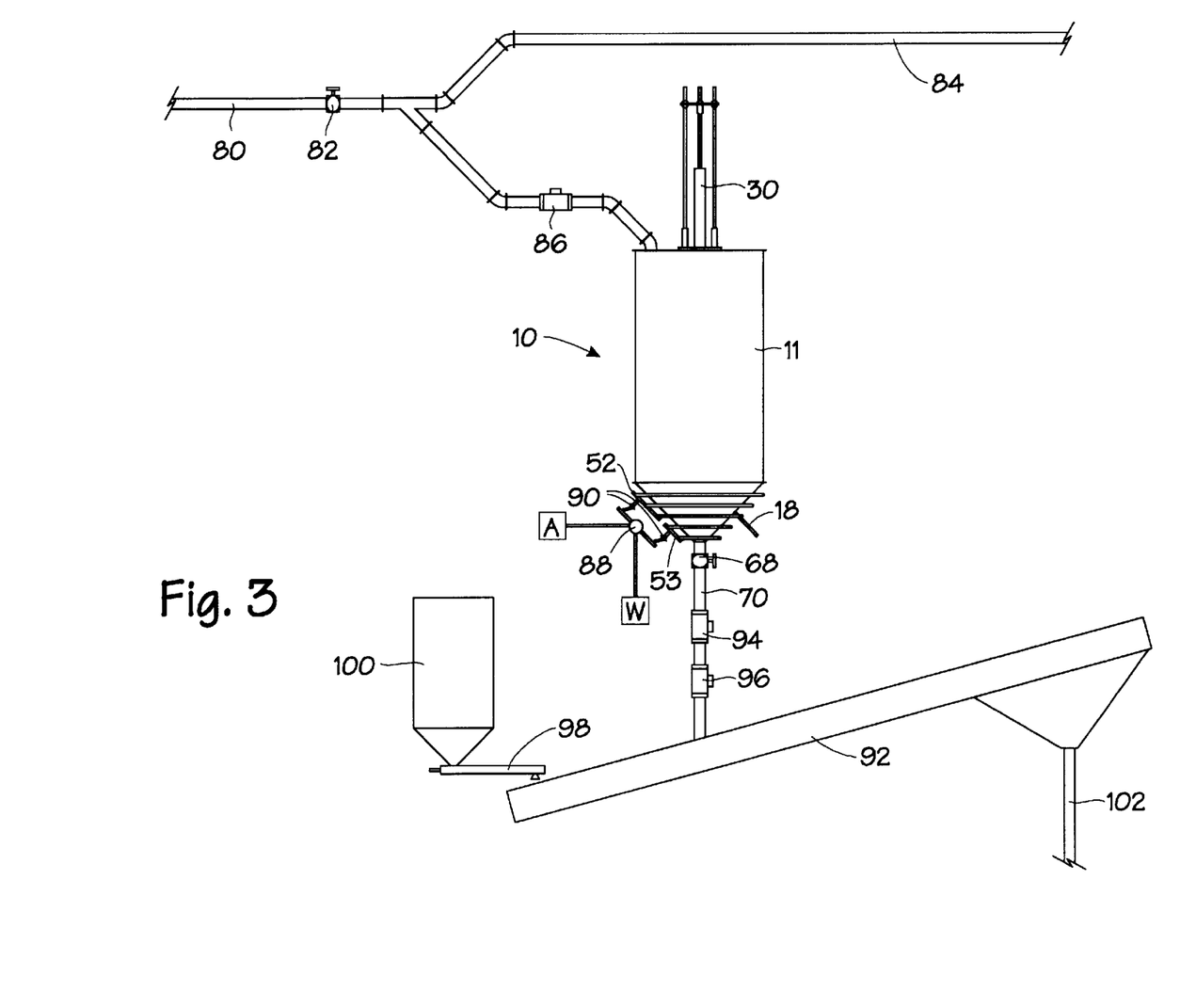
FIG. 3 is a schematic diagram of a high density slurry or paste backfill production facility which incorporates the novel integral containment vessel and high density slurry or paste producing unit.

FIG. 3 illustrates a high density slurry/paste production facility which employs the aforementioned integral containment vessel and high density slurry or paste producing unit 10. A dilute tailings slurry from the mill enters the system through conduit means 80 to selector valve 82. The selector valve 82 is used to direct the slurry to either the silo 11 or on to a surface disposal site via conduit means 84. If a second silo (not shown in FIG. 3) is included in the system, valve 82 and conduit means 84 would direct the material to the second silo. The quantity of slurry entering the silo 11 is measured in terms of flow rate and total flow by means of a flow meter 86.

Silo 11 has a preferred geometry: the height of the tank portion being about twice the diameter, with a conical bottom having a 45° slope. Once the tailings slurry (usually between 20–30% pulp density) enters the silo 11, air from source A is introduced via valve 88 and metering valves 90 through the nozzle manifolds 52, 53 and enters the silo 11 through the plurality of nozzles 50 to agitate the settling material. The placement, vertical and horizontal angles of nozzles has an effect on the agitation and fluidization processes, and their particulars depend on the size of the silo and the specific gravity of the tailings material.

While the tailings material is settling, percolation screen 16 allows percolated water to exit the silo via conduit means 18 (as shown in FIG. 2*a*). Air nozzles 42 blow air through the screen 16 to keep the screen from plugging with fine particles. Once the material has dewatered for a specified time to bring the pulp density to between 76% and 86% solids, again depending on the specific gravity and particle size distribution of the material as well as the desired consistency of the final product, the water that has collected on top of the paste is decanted by actuating the ram 30 on the percolation/decant insert and allowing the water to exit the silo by conduit means 18.

Now that a paste or high density slurry exists in the silo 11, it is necessary to fluidize the material to allow it to exit. Fluidization of tailings by air in a viscous medium is affected by a number of factors, such as particle size, water content in settled bed, flow velocity and fluidizing time. Air from source A and, if desired, water from source W are introduced through control valve 88 into supply manifolds 52, 53 and through the plurality of nozzles 50 (not shown in FIG. 3 because of the scale of the drawing) which urges the paste to exit the silo 11 via outflow conduit 70 once valve 68 has been opened.

On its voyage to screw mixer 92, the pulp density of the material is monitored by density meter 94. Flow meter 96 measures the quantity of material entering mixer 92 as well. By calculation, the information from density meter 94 and flow meter 96 is used to determine the feed rate for cement as controlled by weigh feeder 98 mounted directly below cement hopper 100.

When the paste and cement reach the upper end of screw mixer 92 they have been sufficiently mixed to produce a cemented tailings backfill which is fed by gravity or pumped to underground workings through conduit means 102.

The system, as shown in FIG. 3, constitutes a batch plant as it takes between 3 to 8 hours, depending on the incoming material. If a mine requires a continuous system another silo equipped with the same working components is added and with the paste being fed in a similar manner into the same screw mixer 92. While the material in the first silo is being emptied, the material in the second silo is being thickened. The silos would obviously be sized to provide the require tons per hour output that the mine requires.

This system is designed to use total tailings but depends on the grind or fineness of the mill output. If the tailings are too fine, such as in the case of some gold mines, an optional agglomeration unit may be added to the system.

For varied reasons, total tailings as mine backfill material is not always desired. In mills that refine gold bearing ore, the ore must be ground to a very fine powder to allow complete extraction of the gold. The resulting tailings are extremely fine and the finer portions of this material is commonly referred to as "slimes" due to its consistency when wet. It requires more binder or cement to achieve the same strength as a coarser material. It also tends to leak out of an underground stope if the water content of the fill is too high.

It does however have a couple of advantages. If used in paste fill, it helps the paste to flow through the pipeline somewhat like a lubricant. If a total tailings is used, the paste usually has a lower moisture content.

When the finer portion of tailings is to be excluded from the backfill, a hydrocyclone or other such device may be used to separate or classify the finer and coarser materials. Most existing backfill plants will have a cyclone in place.

Figure 4:
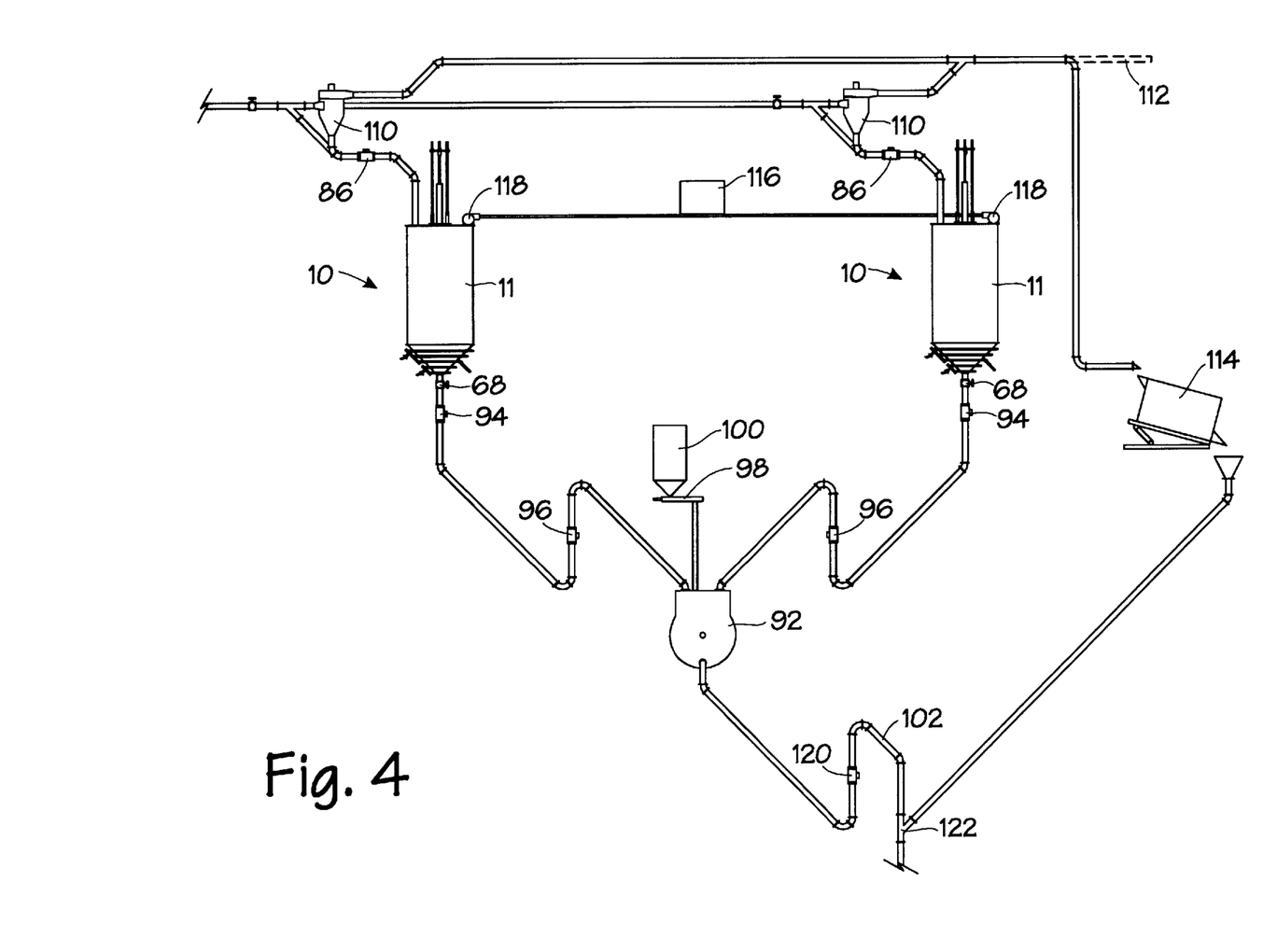
FIG. 4 is a schematic diagram of another high density slurry or paste backfill production facility which incorporates more than one of the novel integral containment vessels and high density slurry or paste producing units.

FIG. 4 illustrates another backfill paste production facility which includes a pair of the integral containment vessels and high density slurry or paste producing units 10 for continuous paste backfill production. Regardless of its continuous production capabilities, the type of system illustrated in FIG. 4 is particularly useful if for any reason, a mine cannot use total tailings from the mill as backfill. This system employs a hydrocyclone 110 at the top of each silo 11 to separate the finer material. The finer material, or slimes, can then be optionally pumped to a tailings pond via conduit 112 or where sending this fine material to the tailings pond is not acceptable, the cyclone overflow can be sent to an agglomeration plant 114. The agglomeration plant 114 is used to pelletize the fine materials and inject them into the mine backfill supply pipe 102 after the mixer 92 as will be explained in greater detail hereinbelow. The integration of the pelletized fine material with the paste or high density slurry results in a material having equal or better strength than the strength of the slurry or paste material alone.

In order to speed settling of the solids in the silos 11, a small amount of flocculent from flocculant tank 116 can be injected into the slurry during or before agitation. Since the quantity of flocculant required to be injected is relative to quantity of slurry in the silos 11, flocculant metering pumps 118 ensure that the right amount of flocculent is injected and on a continuous basis in accordance with the amount of slurry as detected by inflow meters 86. It will be appreciated that injecting flocculant at the same time that the slurry is being pumped into the silo 11 will tend to reduce the required agitation time.

The paste or high density slurry is produced in the silos 11 as explained above and in a manner so as to provide continuous consumption of the tailings and/or continuous production of paste backfill. Once the paste in the one silo has been fluidized, the valve respective 68 is opened to permit the paste to flow to mixer 92. Most types of mixers such as commercially available paddle type or passive mixers can be used in these systems although some consideration should be paid to the particle size distribution of the tailings material.

Cement or other binder(s) used for the cementation of the tailings can be stored in its own silo(s) 100 and delivered to the mixer 92 as required. The amount of binder to be added is determined by the strength requirements of the mine. Based thereon, the rate of addition of binder or setting agent is then dependent on the density and flow rate of the paste as measured by meters 96, 94, respectively. In addition to the density meters 96 which monitor the density of the paste material prior to the mixer, it is preferable to also include a density meter 120 after the mixer 92 to provide a final product density and valuable feedback to ensure the proper proportions of setting agent and, more importantly, the amount of water, are carefully controlled.

Valves used in controlling the flow of either slurries or paste should be of a type that allow opening to the same diameter as the pipe to which they are attached. Butterfly valves, for example, have the flap in the centre of the valve and, therefore, even when open, tend to plug the line very easily. The most satisfactory type of valve has been found to be a pneumatically actuated pinch valve which are available in almost any size.

As explained briefly above, the very fine materials or slimes from the total tailings can be pre-separated via hydrocyclones 110 and passed to the agglomeration plant 114 to be processed into pellets. The agglomerated material or pellets are then introduced into the system after the mixer 92 by means of a pellet injection 'Y' 122. The agglomeration plant 114 takes in the slimes, adds binders while tumbling, thus producing pellets. The pellets may be stored until hardened or cured then fed into system or they may be flash cured by means of a dryer upon exiting the agglomeration plant 114 and directly injected into the system. In general, the pellet injection 'Y' 122 uses gravity to feed the pellets into the mixer discharge line 102. However, advantage can be taken of the vacuum created at the 'Y' 122 when paste backfill is flowing down the line 102 under the influence of gravity.

There has been shown and described above a novel integral containment vessel and high density slurry or paste producing unit, a method for producing high density slurry and/or paste backfill, and examples of associated plant facilities which incorporates both of these aspects of the invention. It will be appreciated that various modifications and/or substitutions can be effected within the present technology without departing from the spirit or scope of the claims as appended hereto.

We claim:

1. A high density slurry or paste production apparatus for producing a high density slurry or paste from mine tailings for use in a backfill preparation for mining operations, wherein the mine tailings comprise a mixture of water and solids, with the solids being settlable in the water under the influence of gravity, said apparatus comprising:
   a containment vessel into which a quantity of mine tailings can be input;
   means for percolating water from the mixture as the solids are settling;
   means for injecting air into the mixture to agitate the solids while they are settling;
   means for decanting clarified water from the surface of the mixture when the solids have substantially settled to produce a high density slurry or paste from the settled solids;
   means for air fluidizing the high density slurry or paste to enable the high density slurry or paste to be removed from the vessel under the influence of gravity.

2. The apparatus as claimed in claim 1, wherein said means for percolating water from the mixture comprises a conduit defined at least in part by a screen through which said water can percolate and through which said solids are substantially impassable.

3. The apparatus as claimed in claim 2, further comprising means for removing solids which become clogged in any passages in the screen.

4. The apparatus as claimed in claim 3, wherein said means for removing solids which become clogged in any passages in the screen comprises a plurality of cleaning air nozzles disposed within said conduit and directed at said screen, and means for selectively conducting air under pressure from a source to one or more of said plurality of cleaning air nozzles.

5. The apparatus as claimed in claim 1, wherein said means for injecting air into the mixture to agitate the solids while they are settling comprises a plurality of mixture agitating air nozzles disposed at or near the bottom of the vessel, and means for selectively conducting air under pressure from a source to said plurality of mixture agitating air nozzles.

6. The apparatus as claimed in claim 5, wherein said mixture agitating air nozzles are insertable through fittings into the vessel and lockable therein, and wherein said air under pressure is communicated to said plurality of mixture agitating air nozzles via a manifold which is located exteriorly of the vessel.

7. The apparatus as claimed in claim 1, wherein said means for decanting clarified water from the surface of the mixture comprises a variable height conduit disposed vertically above said means for percolating water from the mixture, and means for varying the height of said variable height conduit above and below the surface level of the mixture in the vessel.

8. The apparatus as claimed in claim 7, wherein said variable height conduit comprises a spring over which a flexible covering is disposed.

9. The apparatus as claimed in claim 7, wherein said means for varying the height of said variable height conduit above and below the surface level of the mixture in the vessel comprises a pneumatic cylinder having a piston, means for connecting said piston to the upper end of said variable height conduit, and means for supplying air under pressure from a source to said pneumatic cylinder.

10. The apparatus as claimed in claim 1, wherein said means for air fluidizing the high density slurry or paste comprises a plurality of fluidizing air nozzles disposed at or near the bottom of the vessel, and means for selectively conducting air under pressure from a source to said plurality of fluidizing air nozzles.

11. The apparatus as claimed in claim 1, wherein said means for air fluidizing the high density slurry or paste and said means for injecting air into the mixture to agitate the solids while they are settling are one in the same.

12. The apparatus as claimed in claim 1, further including means to selectively supply a quantity of water to said fluidized high density slurry or paste to facilitate its removal from the vessel.

13. The apparatus as claimed in claim 1, further comprising means for removal from the vessel of the percolated and/or decanted water.

14. The apparatus as claimed in claim 1, wherein the containment vessel comprises a silo.

15. The apparatus as claimed in claim 14, wherein the silo is substantially cylindrical and wherein the height of the silo is about twice its diameter.

16. The apparatus as claimed in claim 15, wherein the bottom of the silo is conical and downwards convergent.

17. A method of producing high density slurry or paste for use in backfill preparations for mining operations comprising the steps of:

introducing a quantity of mill tailings into a vessel, said mill tailings comprising a mixture of solids and water;

allowing the solids in said mixture to settle while percolating water from the mixture;

agitating the solids in said mixture by injecting air into said mixture such that settlement of the solids can still occur but into a substantially homogeneous layer;

decanting water from above the substantially homogeneous layer of settled solids to leave a high density slurry or paste;

fluidizing the high density slurry or paste with air; and removing the fluidized high density slurry or paste from the vessel.

18. The method of claim 17, further comprising the step of settling the substantially homogeneous layer of solids until the solids content is between about 76–86% by weight prior to the step of decanting water.

19. The method of claim 17, further comprising the step of mixing a predetermined amount of setting agent with the high density slurry or paste and forming a settable backfill composition, said steps of mixing and forming being subsequent to the step of removing the fluidized high density slurry or paste from the vessel.

20. The method of claim 17, further comprising the step of mixing a predetermined amount of cement with the high density slurry or paste and forming a settable backfill composition, said steps of mixing and forming being subsequent to the step of removing the fluidized high density slurry or paste from the vessel.

21. The method of claim 20, further comprising the steps of ascertaining the density and flow rate of the high density slurry or paste and determining a rate of addition of cement based on the density and flow rate, prior to the step of mixing a predetermined amount of cement with the high density slurry or paste.

22. The method of claim 20, further comprising the steps of ascertaining the density and flow rate of the high density slurry or paste and determining a rate of addition of cement agent based on the density and flow rate, prior to the step of mixing a predetermined amount of cement with the high density slurry or paste.

23. A backfill paste production system for use in mining amount of cement with the high density slurry or operations, comprising:

at least one paste production apparatus as claimed in claim 1;

means for selectively communicating raw mill tailings to said at least one paste production apparatus;

means for selectively removing high density slurry or paste from said at least one paste production apparatus; and means for mixing the removed high density slurry or paste with a setting agent to form a settable backfill high density slurry or paste.

24. The system as claimed in claim 23, further including means for feeding and/or transporting said settable backfill high density slurry or paste to a backfill site.

25. The system as claimed in claim 23, wherein there are two or more of said paste production apparatuses, wherein said means for selectively communicating raw mill tailings to said at least one paste production unit alternately communicates said mill tailings to each of said two or more paste production apparatuses, and wherein said means for selectively removing high density slurry or paste from said at least one paste production apparatus alternately removes high density slurry or paste from said two or more paste production apparatuses, whereby overlapping of high density slurry or paste production can occur.

26. The system as claimed in claim 23, further comprising means for measuring the density and flow rate of the high density slurry or paste removed from each of said paste production apparatuses and means for determining the feed rate of setting agent to be mixed with the high density slurry or paste.

27. The system as claimed in claim 23, wherein the setting agent is cement.

28. The system as claimed in claim 23, including means for separating out the very fine material of said raw mill tailings before said raw mill tailings are selectively communicated to said at least one paste production apparatus.

29. The system as claimed in claim 28, further including agglomeration means for pelletizing said very fine material separated out from said raw mill tailings.

30. The system as claimed in claim 29, further including means for combining said pelletized very fine material with and into said settable backfill high density slurry or paste.

31. The system as claimed in claim 23, including means for adding a predetermined amount of flocculant to said high density slurry or paste.

32. A method of producing high density slurry or paste for use in backfill preparations for mining operations comprising the steps of:

introducing a quantity of mill tailings into a vessel, said mill tailings comprising a mixture of solids and water in a ratio of about 20–30% solids by weight;

allowing the solids in said mixture to settle while percolating water from the mixture;

agitating the solids in said mixture by injecting air into said mixture such that settlement of the solids can still occur but into a substantially homogeneous layer;

decanting water from above the substantially homogeneous layer of settled solids to leave a high density slurry or paste;

fluidizing the high density slurry or paste with air; and removing the fluidized high density slurry or paste from the vessel.

33. The method of claim 32, further comprising the step of settling the substantially homogeneous layer of solids until the solids content is between about 76–86% by weight prior to the step of decanting water.

34. The method of claim 32, further comprising the steps of mixing a predetermined amount of setting agent with the high density slurry or paste and forming a settable backfill composition, said steps of mixing and forming being subsequent to the step of removing the fluidized high density slurry or paste from the vessel.

35. The method of claim 34, further comprising the steps of ascertaining the density and flow rate of the high density slurry or paste and determining a rate of addition of setting agent based on the density and flow rate, prior to the step of mixing a predetermined amount of setting agent with the high density slurry or paste.

36. The method of claim 32, further comprising the steps of mixing a predetermined amount of cement with the high density slurry or paste and forming a settable backfill composition, said steps of mixing and forming being subsequent to the step of removing the fluidized high density slurry or paste from the vessel.

37. The method of claim 36, further comprising the steps of ascertaining the density and flow rate of the high density slurry or paste and determining a rate of addition of cement based on the density and flow rate, prior to the step of mixing a predetermined amount of cement with the high density slurry or paste.

* * * * *